(12) United States Patent
Mitsuoka et al.

(10) Patent No.: US 10,240,653 B2
(45) Date of Patent: Mar. 26, 2019

(54) AIR INTAKE DEVICE

(71) Applicant: AISIN SEIKI KABUSHIKI KAISHA, Kariya-shi, Aichi-ken (JP)

(72) Inventors: Mitsuki Mitsuoka, Toyota (JP); Hiromitsu Ishihara, Okazaki (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 84 days.

(21) Appl. No.: 15/631,938

(22) Filed: Jun. 23, 2017

(65) Prior Publication Data

US 2017/0370435 A1    Dec. 28, 2017

(30) Foreign Application Priority Data

Jun. 24, 2016 (JP) ................. 2016-125085

(51) Int. Cl.
*F02B 31/04* (2006.01)
*F16F 1/04* (2006.01)
*F02M 35/10* (2006.01)
*F02M 35/108* (2006.01)

(52) U.S. Cl.
CPC .............. *F16F 1/041* (2013.01); *F02B 31/04* (2013.01); *F02M 35/1085* (2013.01); *F02M 35/10091* (2013.01); *Y02T 10/146* (2013.01)

(58) Field of Classification Search
CPC ............... F16F 1/041; F02M 35/1085; F02M 35/10091; F02M 35/1222; F02B 31/04; F02D 9/02; F02D 2009/0201; F02D 2009/0262; F02D 2009/0264; F02D 2009/0279; F02D 6/1065; F02D 9/109
See application file for complete search history.

(56) References Cited

U.S. PATENT DOCUMENTS

| 4,073,278 | A | * | 2/1978 | Glenn | ..................... F02D 17/02 |
| | | | | | 123/198 F |
| 4,787,353 | A | * | 11/1988 | Ishikawa | ............... F02D 11/105 |
| | | | | | 123/399 |
| 4,864,996 | A | * | 9/1989 | Hensel | .................. F02B 61/045 |
| | | | | | 123/442 |
| 5,522,361 | A | * | 6/1996 | Pickman | .................... F02D 9/02 |
| | | | | | 123/336 |

(Continued)

FOREIGN PATENT DOCUMENTS

JP      2008-038758 A      2/2008

*Primary Examiner* — Jacob Amick
(74) *Attorney, Agent, or Firm* — Buchanan Ingersoll & Rooney PC

(57) ABSTRACT

An air intake device includes: an air intake valve provided so as to change intake air by rotation of a rotation shaft; an actuator which is a driving source for rotating and driving the rotation shaft of the air intake valve; a first link member rotatable by a predetermined operation angle about the rotation shaft; a second link member rotatably connected to the first link member; a connection member which connects the first link member and the second link member so as to be rotatable to each other; and a biasing member whose one side end is engaged to the first link member and whose other side end is engaged to the second link member or the connection member to bias the first link member and the second link member or the connection member so that rattling between the first link member and the second link member is suppressed.

18 Claims, 5 Drawing Sheets

(56) References Cited

U.S. PATENT DOCUMENTS

| | | | |
|---|---|---|---|
| 5,829,409 A * | 11/1998 | Saito | F02D 9/02 |
| | | | 123/396 |
| 2004/0173183 A1* | 9/2004 | Yu | F02D 9/02 |
| | | | 123/399 |
| 2009/0250025 A1 | 10/2009 | Kitadani et al. | |

* cited by examiner

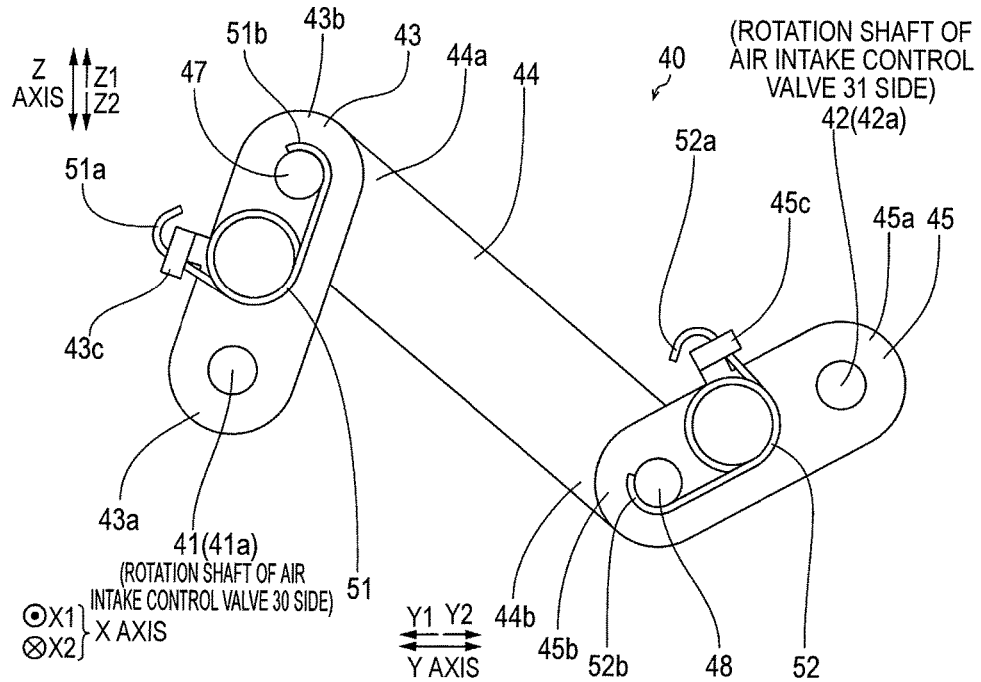
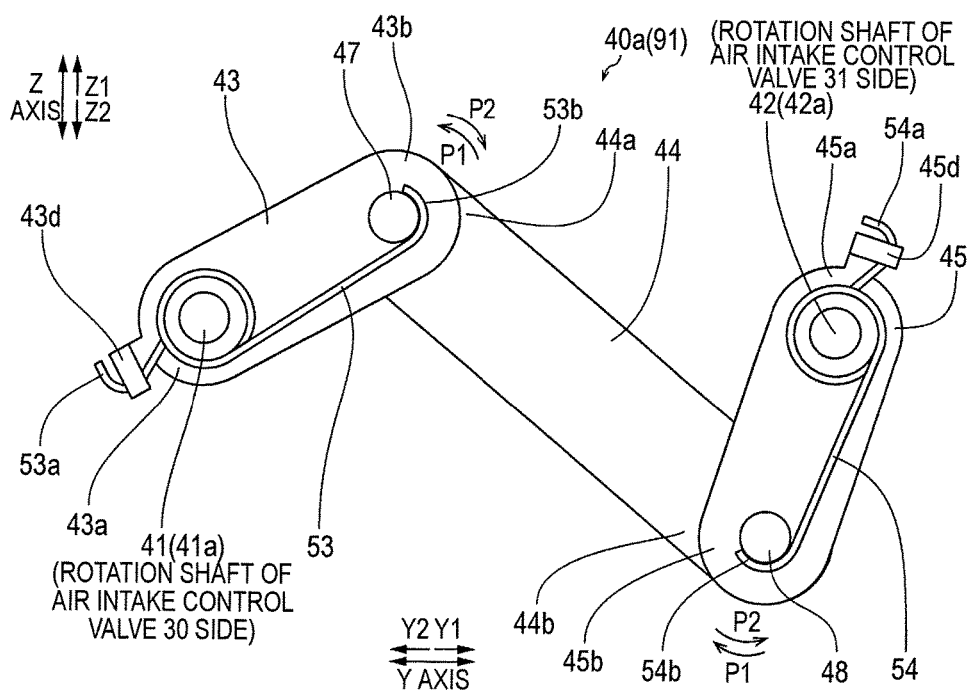

AIR INTAKE DEVICE

CROSS REFERENCE TO RELATED APPLICATIONS

This application is based on and claims priority under 35 U.S.C. § 119 to Japanese Patent Application 2016-125085, filed on Jun. 24, 2016, the entire contents of which are incorporated herein by reference.

TECHNICAL FIELD

This disclosure relates to an air intake device, and particularly to an air intake device including an air intake valve and an actuator which rotates and drives the air intake valve.

BACKGROUND DISCUSSION

In the related art, an air intake device including an air intake valve and an actuator which rotates and drives the air intake valve is known (for example, see JP-2008-38758A (Reference 1)).

The Reference 1 discloses a variable air intake device (air intake device) of a V-type internal combustion engine which is provided for each air intake pipe connecting a surge tank and each air intake port of the V-type internal combustion engine with each other and includes a variable air intake valve (air intake valve) which makes an air intake pipe length variable. In the variable air intake device of the V-type internal combustion engine, a rotation shaft of the variable air intake valve attached to an air intake pipe group corresponding to a cylinder row in one side thereof and a rotation shaft of the variable air intake valve attached to an air intake pipe group corresponding to a cylinder row in the other side extend to be parallel to each other and are rotatably attached to a valve housing. In addition, the rotation shaft in one side thereof and the rotation shaft in the other side thereof are connected to be linkable via a plurality of link members. All the variable air intake valves are configured to be synchronized and rotated with each other by the rotation shaft in the other side thereof (driven side rotation shaft) being rotated via the plurality of link members according to rotation of the rotation shaft in one side thereof (drive side rotation shaft) by driving force of the actuator. A spring is fitted to the rotation shaft in the other side thereof (driven side rotation shaft), one side end of the spring is fixed to the valve housing of an internal combustion engine main body, and the other side end thereof is fixed to the rotation shaft. Accordingly, by utilizing biasing force of the spring, rattling of a connecting portion interposed between the drive side rotation shaft, the plurality of link members and the driven side rotation shaft is configured to be suppressed.

However, in a variable air intake device of a V-type internal combustion engine described in the Reference 1, since one side end of a spring is fixed to a valve housing of an internal combustion engine main body and the other side end thereof is fixed to a rotation shaft (driven side rotation shaft) in order to suppress rattling of a connection portion between the rotation shaft and a plurality of link members, biasing force of the spring is always applied in a direction in which the driven side rotation shaft is rotated. Therefore, there is a problem that when the variable air intake valve is rotated, it is necessary to generate a torque (driving force) to overcome the biasing force of the spring in an actuator to cause the actuator to rotate the drive side rotation shaft, and thus the actuator becomes large in size.

Thus, a need exists for an air intake device which is not susceptible to the drawback mentioned above.

SUMMARY

An air intake device according to an aspect of this disclosure includes an air intake valve which is provided so as to change intake air by a rotation shaft being rotated; an actuator which is a driving source for rotating and driving the rotation shaft of the air intake valve; a first link member rotatable by a predetermined operation angle about a rotation shaft; a second link member rotatably connected to the first link member; a connection member which connects the first link member and the second link member so as to be rotatable to each other; and a biasing member whose one side end is engaged to the first link member and whose other side end is engaged to the second link member or the connection member to bias the first link member and the second link member or the connection member so that rattling between the first link member and the second link member is suppressed.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a view illustrating a configuration of the link mechanism in the air intake device according to the first embodiment disclosed here;

FIG. 6 is a view illustrating a configuration of a link mechanism according to a modification example of the first embodiment disclosed here;

DETAILED DESCRIPTION

Hereinafter, embodiments disclosed here will be described based on the drawings.

First Embodiment

First, with reference to FIG. 1 to FIG. 5, configuration of an air intake device 90 mounted in a V-type six-cylinder engine 100 (example of V-type internal combustion engine) according to a first embodiment disclosed here will be described.

Schematic Structure of V-Type Six-Cylinder Engine

Figure 1:
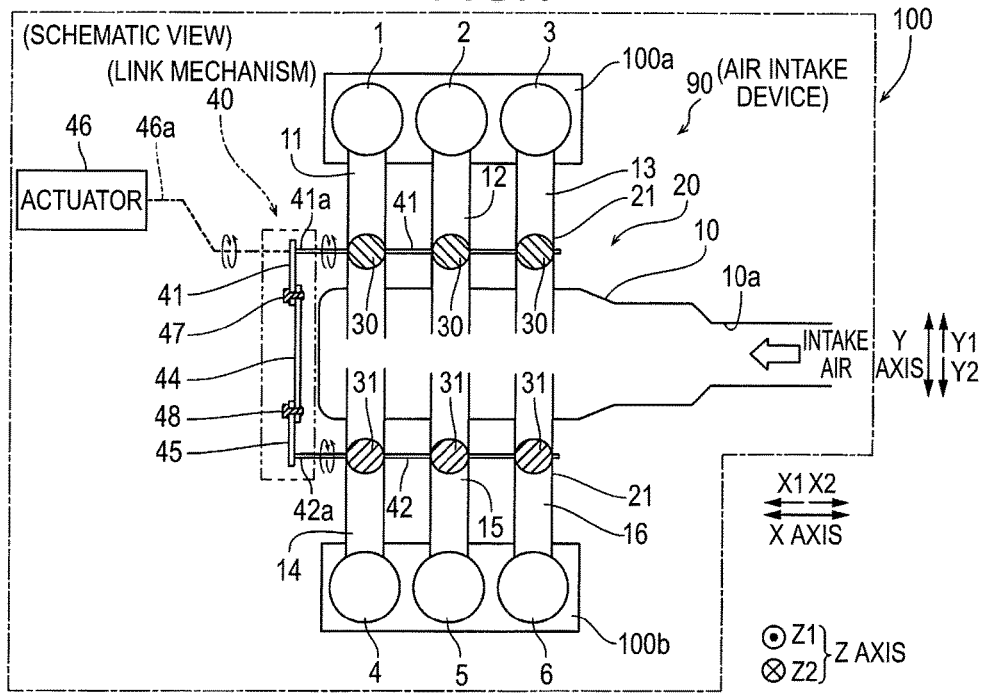
FIG. 1 is a view schematically illustrating a configuration of an air intake device according to a first embodiment disclosed here.

As illustrated in FIG. 1, the air intake device 90 is provided in the V-type six-cylinder engine 100 for an automobile, which is a gasoline engine. The air intake device 90 includes a surge tank 10 having an air intake port 10a and an air intake device main body 20 including air intake ports 11 to 13 and air intake ports 14 to 16 disposed downstream of the surge tank 10. The air intake ports 11 to 13 connect the surge tank 10 and cylinders 1 to 3 provided in a first bank 100a of the V-type six-cylinder engine 100 to each other, respectively. In addition, the air intake ports 14 to 16 connect the surge tank 10 and the cylinders 4 to 6 provided in a second bank 100b of the V-type six-cylinder engine 100 to each other, respectively. FIG. 1 schematically illustrates the configuration of air intake control valves 30 and 31 (to be described below), a link mechanism 40 (within the two-dot chain line frame), and an actuator 46 serving as a drive source of the link mechanism 40.

Figure 2:
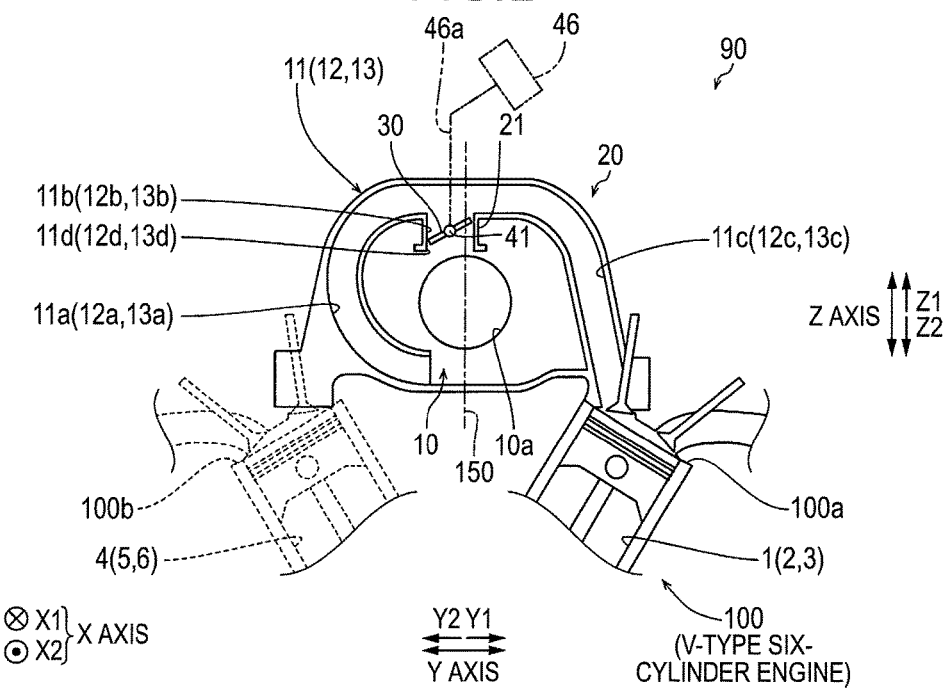
FIG. 2 is a cross-sectional view schematically illustrating the configuration of the air intake device according to the first embodiment disclosed here.

In addition, as illustrated in FIG. 2, the air intake port 11 includes a first port portion 11a, a second port portion 11b, and an outlet port portion 11c connected to a cylinder 1 on the downstream side thereof. The second port portion 11b connects the surge tank 10 and the outlet port portion 11c to each other via an air intake control valve 30. The air intake control valve 30 is configured to open and close an opening portion 11d which is a connecting portion between the second port portion 11b and the outlet port portion 11c. In a state where the air intake control valve 30 is closed, a long port having a large air intake path length is formed by the first port portion 11a and the outlet port portion 11c, and in a state where the air intake control valve 30 is opened, a short port having a small air intake path length is formed by the second port portion 11b and the outlet port portion 11c. Accordingly, the air intake device main body 20 is configured to be able to change the air intake path length.

Although FIG. 2 illustrates a sectional structure in the Y-Z plane at a position of the air intake port 11 in the air intake device main body 20, as illustrated in FIG. 1, the air intake control valve 30 (example of first air intake valve) is also provided in each position of the air intake ports 12 and 13. Therefore, the sectional structure illustrated in FIG. 2 is the same for the air intake ports 12 and 13. In addition, the air intake device main body 20 is also provided with an air intake control valve 31 (example of second air intake valve) for changing the air intake path length in the air intake ports 14 to 16 (see FIG. 1) corresponding to the cylinders 4 to 6 (illustrated by broken lines). Therefore, the sectional structure in the Y-Z plane at the positions of the air intake ports 14 to 16 has a sectional structure symmetrical with respect to the structure illustrated in FIG. 2 about an axis 150 in the Y axis direction. Accordingly, the air intake control valve 30 functions as a control valve for variable intake air which changes the air intake path length to each of the cylinders 1 to 3, and the air intake control valve 31 functions as a control valve for variable intake air which changes air intake path length to each of the cylinders 4 to 6. Therefore, the air intake device 90 is configured so as to be capable of supplying a more appropriate amount of intake air to the cylinders 1 to 6 by changing the air intake path length according to the engine speed and the engine load. The air intake control valves 30 and 31 are rotatably provided in the valve housing 21 of the air intake device main body 20.

In addition, as illustrated in FIG. 1, the air intake device 90 includes the link mechanism 40 (within a two-dot chain line frame) for all at once driving opening and closing of a total of six air intake control valves including three air intake control valves 30 on the Y1 side and three air intake control valves 31 on the Y2 side. Hereinafter, the link mechanism 40 will be described.

Structure of Link Mechanism

The link mechanism 40 includes a drive side rotation shaft 41 (example of rotation shaft) which rotates the three air intake control valves 30 all at once, a driven side rotation shaft 42 (example of rotation shaft) which rotates the three air intake control valves 31 all at once, a plurality of link members (43 to 45) which link the drive side rotation shaft 41 and the driven side rotation shaft 42, and an actuator 46 which rotates the drive side rotation shaft 41 as a driving source. The air intake control valve 30 and the drive side rotation shaft 41 are made of resin. In addition, the air intake control valve 31 and the driven side rotation shaft 42 are made of resin. The actuator 46 and the drive side rotation shaft 41 are configured to connect to each other by a link member 46a and to rotate the drive side rotation shaft 41 by the driving force of the actuator 46.

Figure 3:
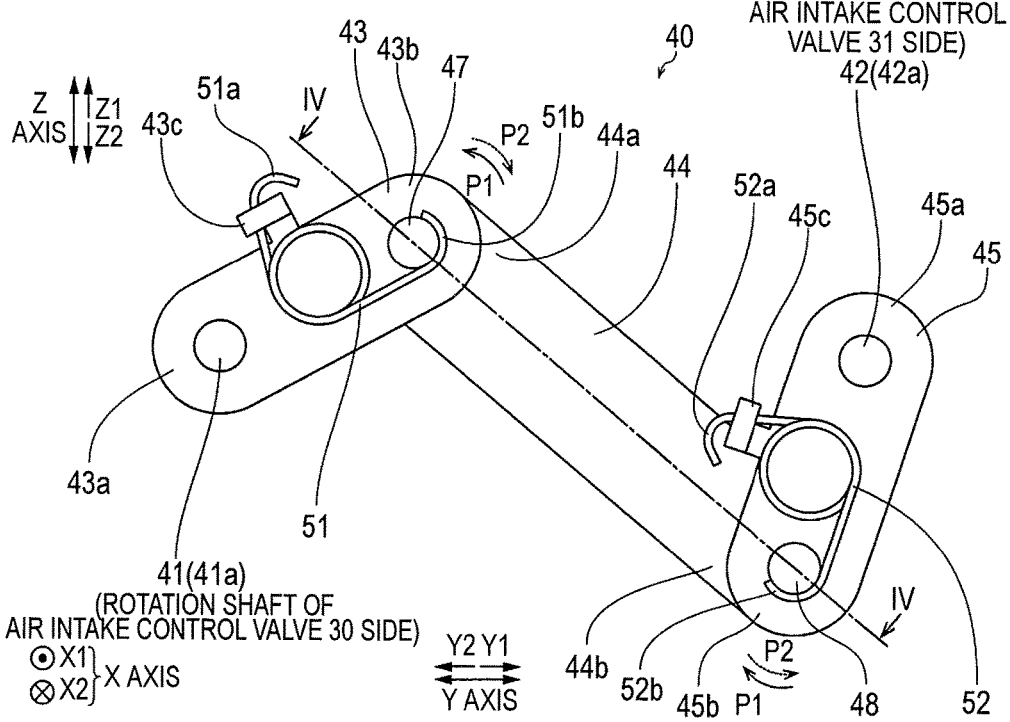
FIG. 3 is a view illustrating a configuration of a link mechanism in the air intake device according to the first embodiment disclosed here.
Figure 4:
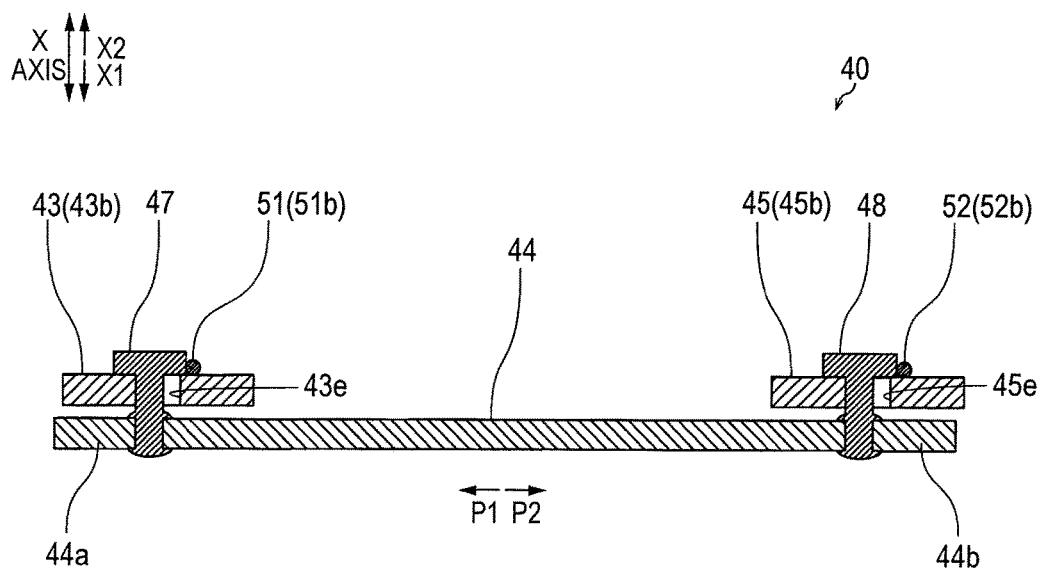
FIG. 4 is a cross-sectional view of the link mechanism taken along line IV-IV of FIG. 3.

More specifically, as illustrated in FIG. 3, one side end portion 43a of the drive side link member 43 (example of first link member) is fixed to an end portion 41a on the X1 side of the drive side rotation shaft 41. The other side end portion 43b of the drive side link member 43 and one side end portion 44a of the intermediate link member 44 (example of second link member) are rotatably connected to each other via the pin member 47 (example of connection member and first connection member). As illustrated in FIG. 4, a hole portion 43e having an inner diameter slightly larger than an outer diameter of the pin member 47 is formed at one side end 43a of the drive side link member 43, and in a state where the pin member 47 is inserted into the hole portion 43e, a tip of the pin member 47 is fixed to the intermediate link member 44 by a caulking process. Therefore, a gap is generated between the pin member 47 fixed to the intermediate link member 44 and the hole portion 43e of the drive side link member 43.

In addition, as illustrated in FIG. 4, one side end portion 45a of the driven side link member 45 (example of first link member) is fixed to an end portion 42a of the X1 side of the driven side rotation shaft 42. The other side end portion 45b of the driven side link member 45 and the other side end portion 44b of the intermediate link member 44 are rotatably connected to each other via a pin member 48 (example of connection member and second connection member). A hole portion 45e having an inner diameter slightly larger than an outer diameter of the pin member 48 is formed at the other side end portion 45b and in a state where the pin member 48 is inserted into the hole portion 45e, a tip of the pin member 48 is fixed to the intermediate link member 44 by a caulking process. Therefore, a gap is generated between the pin member 48 fixed to the intermediate link member 44 and the hole portion 45e of the driven side link member 45.

Here, in the first embodiment, as illustrated in FIG. 3, a torsion coil spring 51 (example of biasing member and first torsion coil spring) which biases the drive side link member 43 and the pin member 47 is attached to the link mechanism 40 so that the rattling between the drive side link member 43 and the intermediate link member 44 is suppressed by one side end 51a of the link mechanism 40 being engaged to an engagement portion 43c of the drive side link member 43 and the other side end 51b being engaged to the pin member 47. In addition, a torsion coil spring 52 (example of biasing member and example of second torsion coil spring) which biases the driven side link member 45 and the pin member 48 is attached to the link mechanism 40 so that the rattling between the driven side link member 45 and the intermediate link member 44 is suppressed by one side end 52a of the link mechanism 40 being engaged to an engagement portion 45c of the driven side link member 45 and the other side end 52b being engaged to the pin member 48.

In other words, in a state where the pin member 47 is biased with respect to the drive side link member 43 by the torsion coil spring 51 in a direction along a rotation direction (arrow P1 direction) of the drive side link member 43, the intermediate link member 44 is configured so that the intermediate link member 44 is rotated (moved) via the pin member 47 without the rattling according to the rotation of the drive side link member 43 from the first rotation position illustrated in FIG. 3 to the second rotation position illustrated in FIG. 5 and in the arrow P1 direction. Similarly, in a state where the pin member 48 is biased with respect to the driven side link member 45 by the torsion coil spring 52 in the direction along the rotation direction (arrow P1 direction) of the driven side link member 45, the intermediate link member 44 is configured so that the intermediate link member 44 is rotated (moved) via the pin member 48 without the rattling according to the rotation of the driven side link member 45 from the first rotation position illustrated in FIG. 3 to the second rotation position illustrated in FIG. 5 and in the arrow P1 direction. Even when the intermediate link member 44 is rotated in the arrow P2 direction, while biasing force of the torsion coil spring 51 acts on the pin member 47 and biasing force of the torsion coil spring 52 acts on the pin member 48, the intermediate link member 44 is moved without the rattling from the second rotation position illustrated in FIG. 5 to the first rotation position illustrated in FIG. 3.

Accordingly, the drive side rotation shaft 41 rotates the air intake control valve 30 (see FIG. 1) by a predetermined operation angle by the driving force of the actuator 46 (see FIG. 1) and the driven side rotation shaft 42 rotates the air intake control valve 31 (see FIG. 1) by a predetermined operation angle via the drive side link member 43, the pin member 47, the intermediate link member 44, the pin member 48, and the driven side link member 45 according to the rotation of the drive side rotation shaft 41. At this time, the biasing force of the torsion coil spring 51 occurs only between the drive side link member 43 and the intermediate link member 44 via the pin member 47. In other words, the biasing force of the torsion coil spring 51 does not act on the drive side rotation shaft 41. Therefore, since the biasing force of the torsion coil spring 51 is not directly applied to the actuator 46 via the drive side rotation shaft 41, the drive side rotation shaft 41 can be rotated by using the actuator 46 having a smaller capacity. In addition, the drive side rotation shaft 41 does not cause twisted deformation of the drive side rotation shaft 41 due to the biasing force of the torsion coil spring 51.

Similarly, the biasing force of the torsion coil spring 52 is generated only between the driven side link member 45 and the intermediate link member 44 via the pin member 48. In other words, the biasing force of the torsion coil spring 52 does not act on the driven side rotation shaft 42. Therefore, since the biasing force of the torsion coil spring 52 is not applied to the driven side rotation shaft 42, the driven side rotation shaft 42 does not cause twisted deformation due to the biasing force of the torsion coil spring 52. Accordingly, since the range in which the biasing forces of the torsion coil springs 51 and 52 act is restricted in an inside portion of the link mechanism 40, the actuator 46 is configured to be capable of rotating the air intake control valves 30 and 31 independently of the biasing force of the torsion coil springs 51 and 52.

Effect of First Embodiment

In the first embodiment, the following effects can be obtained.

In the first embodiment, as described above, the torsion coil spring 51 which biases the drive side link member 43 and the pin member 47 is included so as to suppress rattling between the drive side link member 43 and intermediate link member 44 by one side end 51a being engaged to the drive side link member 43 and the other side end 51b being engaged to the pin member 47. Accordingly, since the biasing force of the torsion coil spring 51 for suppressing rattling is generated only between the drive side link member 43 and the intermediate link member 44 which are rotatably connected to each other via the pin member 47, direct application of the biasing force of the torsion coil spring 51 to the actuator 46 via the drive side link member 43 and the drive side rotation shaft 41 can be avoided. In other words, the drive side rotation shaft 41 (air intake control valve 30) can be rotated by using the actuator 46 having a smaller capacity without increasing the capacity (driving force) of the actuator 46. As a result, the rattling between the drive side link member 43 fixed to the drive side rotation shaft 41 and the intermediate link member 44 rotatably connected to the drive side link member 43 can be suppressed while an increase in size of the actuator 46 being suppressed.

In addition, in the first embodiment, in a state where the pin member 47 is biased with respect to the drive side link member 43 by the torsion coil spring 51 in the direction along the rotation direction (arrow P1 direction) of the drive side link member 43, the intermediate link member 44 is configured to be rotated (moved) via the pin member 47 according to the rotation of the drive side link member 43. Accordingly, the biasing force of the torsion coil spring 51 for suppressing the rattling can be generated only between the drive side link member 43 and the intermediate link member 44 which are rotatably connected to each other via the pin member 47. Therefore, direct application of the biasing force of the torsion coil spring 51 to the actuator 46 via the drive side link member 43 and the drive side rotation shaft 41 can be easily avoided. In addition, since the biasing force of the torsion coil spring 51 is not applied to the drive side rotation shaft 41 via the drive side link member 43, even if a resin member is used for the drive side rotation shaft 41, generation of the twisted deformation of the drive side rotation shaft 41 due to the biasing force of the torsion coil spring 51 can be easily and reliably suppressed.

In addition, in the first embodiment, a torsion coil spring 52 which biases the driven side link member 45 and the pin member 48 is included so that the rattling between the driven side link member 45 and the intermediate link member 44 is suppressed by one side end 52a being engaged to the driven side link member 45 and the other side end 52b being engaged to the pin member 48. Accordingly, the biasing force of the torsion coil spring 52 for suppressing the rattling can be generated only between the driven side link member 45 and the intermediate link member 44 which are rotatably connected to each other via the pin member 48.

In addition, in the first embodiment, in a state where the pin member 48 is biased with respect to the driven side link member 45 in a direction along a rotation direction (arrow P1 direction) of the driven side link member 45 by the torsion coil spring 52, the driven side link member 45 and the driven side rotation shaft 42 are configured to rotate via the pin member 48 according to rotation of the intermediate link member 44. Accordingly, even if a link mechanism 40 which synchronizes and rotates an air intake control valve 30 provided in the drive side rotation shaft 41 and an air intake control valve 31 provided in the driven side rotation shaft 42 by sequentially interposing the drive side link member 43, the pin member 47, the intermediate link member 44, the pin member 48 and the driven side link member 45 is provided in the air intake device 90, since the small actuator 46 can be used, the degree of freedom of the layout of the respective functional components constituting the air intake devices 90 can be improved.

In addition, in the first embodiment, in a state where one side end 51a is engaged to the drive side link member 43 and the other side end 51b is engaged to the pin member 47, the torsion coil spring 51 is configured so that the other side end 51b biases the pin member 47 in a direction along a rotation direction (arrow P1 direction) of the drive side link member 43. Accordingly, since the pin member 47 can be biased with respect to the drive side link member 43 in the direction along the rotation direction of the drive side link member 43 by using the biasing force of the torsion coil spring 51, generation of rattling can be reliably avoided between the drive side link member 43 and the intermediate link member 44 which are rotatably connected via the pin member 47.

In addition, in the first embodiment, the drive side link member 43 is provided with the engagement portion 43c to which one side end 51a of the torsion coil spring 51 is engaged, and the driven side link member 45 is provided with the engagement portion 45c to which one side end 52a of the torsion coil spring 52 is engaged. Accordingly, in a state where one side end 51a of the torsion coil spring 51 is easily fixed to the drive side link member 43, the biasing force of the torsion coil spring 51 can be applied to the pin member 47. In addition, in a state where one side end 52a of the torsion coil spring 52 is easily fixed to the driven side link member 45, the biasing force of the torsion coil spring 52 can be applied to the pin member 48.

Modification Example of First Embodiment

Next, with reference to FIG. 6, an air intake device 91 according to a modification example of the first embodiment disclosed here will be described. In the modification example of the first embodiment, an example in which disposition positions of the torsion coil springs 53 and 54 are different from those in the first embodiment will be described.

In other words, as illustrated in FIG. 6, in the link mechanism 40a, a torsion coil spring 53 (example of biasing member and first torsion coil spring) is provided between the drive side link member 43 and the pin member 47. One side end 53a of the torsion coil spring 53 is engaged to an engagement portion 43d provided in one side end 43a of the drive side link member 43 and the other side end 53b is engaged to the pin member 47. Similarly, a torsion coil spring 54 (example of biasing member and second torsion coil spring) is provided between the driven side link member 45 and the pin member 48. One side end 54a of the torsion coil spring 54 is engaged to an engagement portion 45d provided in one side end portion 45a of the driven side link member 45 and the other side end 54b is engaged to the pin member 48. Accordingly, in the modification example of the first embodiment, the engagement portion 43d is provided in the drive side link member 43 and the engagement portion 45d is provided in the driven side link member 45. Accordingly, the same effect as the first embodiment can be also obtained.

Second Embodiment

Next, with reference to FIG. 7 and FIG. 8, an air intake device 92 according to a second embodiment disclosed here will be described. In the second embodiment, an example in which the engagement positions of the torsion coil springs 61 and 62 are different from those in the first embodiment will be described. In the drawings, the same reference numerals are given to the same portions of the configuration as those of the first embodiment.

Figure 7:
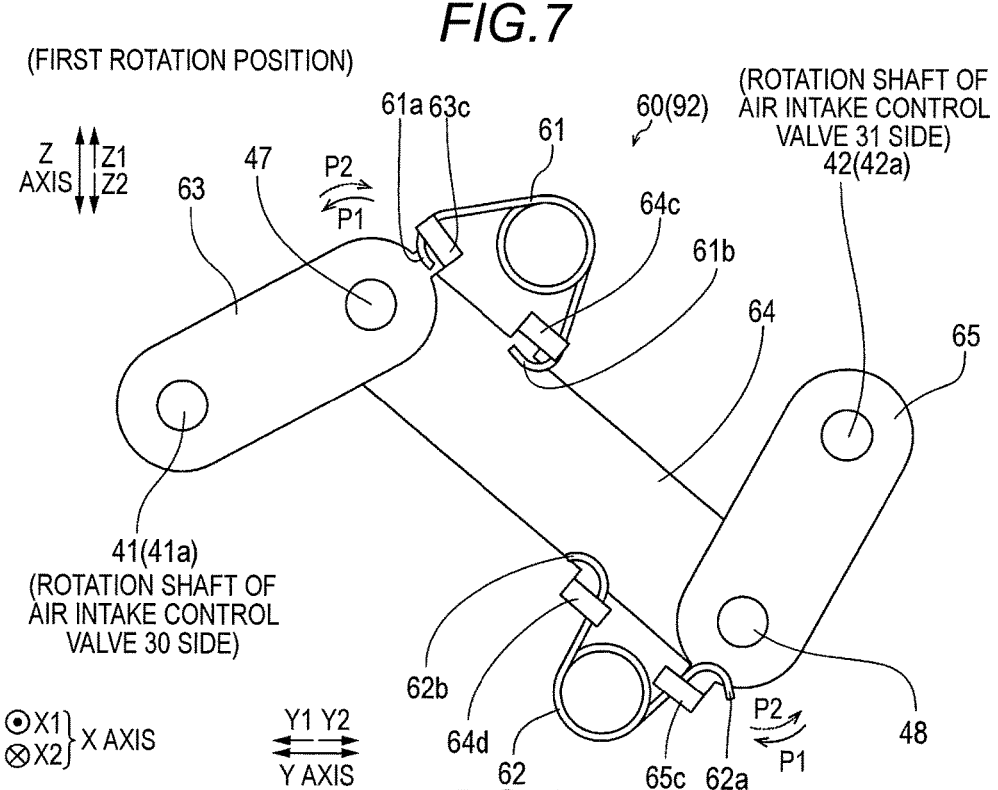
FIG. 7 is a view illustrating a configuration of a link mechanism in an air intake device according to a second embodiment disclosed here.

As illustrated in FIG. 7, the air intake device 92 includes a link mechanism 60. The link mechanism 60 includes a drive side rotation shaft 41, a drive side link member 63, a pin member 47, an intermediate link member 64, a pin member 48, a driven side link member 65, and a driven side rotation shaft 42.

Here, in the second embodiment, a torsion coil spring 61 (an example of biasing member and first torsion coil spring) which biases the drive side link member 63 and the intermediate link member 64 is attached to the link mechanism 60 so that rattling between the drive side link member 63 and the intermediate link member 64 is suppressed by one side end 61a of the link mechanism 60 being engaged to the engagement portion 63c of the drive side link member 63 and the other side end 61b being engaged to the engagement portion 64c of the intermediate link member 64. In addition, a torsion coil spring 62 (example of biasing member and second torsion coil spring) which biases the driven side link member 65 and the intermediate link member 64 is attached to the link mechanism 60 so that rattling between the driven side link member 65 and the intermediate link member 64 is suppressed by one side end 62a of the link mechanism 60 being engaged to the engagement portion 65c of the driven side link member 65 and the other side end 62b being engaged to the engagement portion 64d of the intermediate link member 64.

Figure 8:
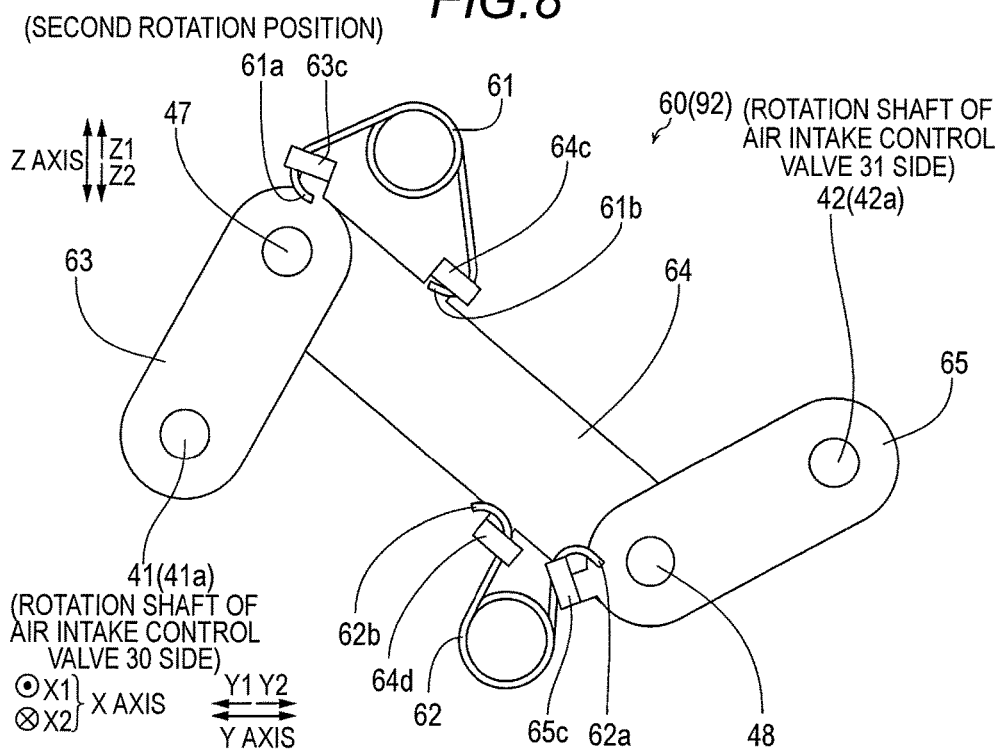
FIG. 8 is a view illustrating a configuration of the link mechanism in the air intake device according to the second embodiment disclosed here.

In other words, in a state where the intermediate link member 64 is biased with respect to the drive side link member 63 in the direction along the rotation direction (arrow P1 direction) of the drive side link member 63 by the torsion coil spring 61, the intermediate link member 64 is configured so that the intermediate link member 64 is rotated (moved) via the pin member 47 according to the rotation of the drive side link member 63 from the first rotation position illustrated in FIG. 7 to the second rotation position illustrated in FIG. 8 and in the arrow P1 direction. Similarly, in a state where the pin member 48 is biased with respect to the driven side link member 65 in the direction along the rotation direction (arrow P1 direction) of the driven side link member 65 by the torsion coil spring 62, the intermediate link member 64 is configured so that the intermediate link member 64 is rotated (moved) via the pin member 48 according to the rotation of the driven side link member 65 from the first rotation position illustrated in FIG. 7 to the second rotation position illustrated in FIG. 8 and in the arrow P1 direction. Even when the intermediate link member 64 is rotated in the arrow P2 direction, while the biasing force of the torsion coil spring 61 acts on the engagement portion 64c of the intermediate link member 64 and the biasing force of the torsion coil spring 62 acts on the engagement portion 64d of the intermediate link member 64, the intermediate link member 64 is moved from the second rotation position illustrated in FIG. 8 to the first rotation position illustrated in FIG. 7. Other configurations of the air intake device 92 are similar to those of the first embodiment.

Effect of Second Embodiment

In the second embodiment, as described above, the torsion coil spring 61 which biases the drive side link member 63 and the intermediate link member 64 is included so that the rattling between the drive side link member 63 and the intermediate link member 64 is suppressed by one side end 61a being engaged to the drive side link member 63 and the other side end 61b being engaged to the intermediate link member 64. Accordingly, since the biasing force of the torsion coil spring 61 for suppressing rattling can be generated only between the drive side link member 63 and the intermediate link member 64 which are rotatably connected to each other via the pin member 47, direct application of the biasing force of the torsion coil spring 61 to the actuator 46 via the drive side rotation shaft 41 and the drive side link member 63 can be avoided. As a result, while an increase in the size of the actuator 46 is suppressed, the rattling between the drive side link member 63 fixed to the drive side rotation shaft 41 and the intermediate link member 64 rotatably connected to the drive side link member 63 can be suppressed.

In addition, in the second embodiment, in a state where the intermediate link member 64 is biased with respect to the drive side link member 63 in the direction along the rotation direction of the drive side link member 63 by the torsion coil spring 61, the intermediate link member 64 is configured to be rotated via the pin member 47 according to the rotation of the drive side link member 63. Accordingly, the biasing force of the torsion coil spring 61 for suppressing the rattling can be generated only between the drive side link member 63 and the intermediate link member 64. Therefore, direct application of the biasing force of the torsion coil spring 61 to the actuator 46 via the drive side link member 63 and the drive side rotation shaft 41 can be avoided. Further, the twisted deformation of the drive side rotation shaft 41 can be easily and reliably suppressed.

In addition, in the second embodiment, the torsion coil spring 62 which biases the driven side link member 65 and the intermediate link member 64 is included so that the rattling between the driven side link member 65 and the intermediate link member 64 is suppressed by one side end 62a being engaged to the driven side link member 65 and the other side end 62b being engaged to the intermediate link member 64. Accordingly, the biasing force of the torsion coil spring 62 for suppressing the rattling can be generated only between the driven side link member 65 and the intermediate link member 64 which are rotatably connected to each other via the pin member 48.

In addition, in the second embodiment, the driven side link member 65 and the driven side rotation shaft 42 are configured to be rotated via the pin member 48 according to the rotation of the intermediate link member 64 in a state where the intermediate link member 64 is biased with respect to the driven side link member 65 in the direction along the rotation direction (arrow P1 direction) of the driven side link member 65 by the torsion coil spring 62. Accordingly, even in a case where the link mechanism 60 which synchronizes and rotates the air intake control valve 30 provided in the drive side rotation shaft 41 and the air intake control valve 31 provided in the driven side rotation shaft 42 by sequentially interposing the drive side link member 63, the pin member 47, the intermediate link member 64, the pin member 48 and the driven side link member 65 is provided in the air intake device 92, since the small actuator 46 can be used, the degree of freedom of the layout of the functional components constituting the air intake device 92 can be improved.

In addition, in the second embodiment, in a state where one side end 61a is engaged to the drive side link member 63 and the other side end 61b is engaged to the intermediate link member 64, the torsion coil spring 61 is configured so that the other side end 61b biases the intermediate link member 64 in the direction along the rotation direction of the drive side link member 63. Accordingly, since the intermediate link member 64 can be biased with respect to the drive side link member 63 in the direction along the rotation direction of the drive side link member 63 by using the biasing force of the torsion coil spring 61, the generation of the rattling between the drive side link member 63 and the intermediate link member 64 which are rotatably connected to each other via the pin member 47 can be reliably avoided.

In addition, in the second embodiment, the intermediate link member 64 is provided with the engagement portion 64c to which the other side end 61b of the torsion coil spring 61 is engaged and the engagement portion 64d to which the other side end 62b of the torsion coil spring 62 is engaged. Accordingly, the biasing force of the torsion coil spring 61 can be applied to the drive side link member 63 in a state where the other side end 61b of the torsion coil spring 61 is easily fixed to the intermediate link member 64. In addition, in a state where the other side end 62b of the torsion coil spring 62 is easily fixed to the intermediate link member 64, the biasing force of the torsion coil spring 62 can be applied to the driven side link member 65. Other effects are similar to those of the first embodiment.

Third Embodiment

Next, with reference to FIG. 9 and FIG. 10, an air intake device 93 according to a third embodiment disclosed here will be described. In the third embodiment, an example in which the drive side link member 73 and the intermediate link member 74 are connected to each other by providing a long hole 75 in the drive side link member 73 will be described. In the drawings, the same reference numerals are given to the same portions of the configuration as those of the first embodiment.

Figure 9:
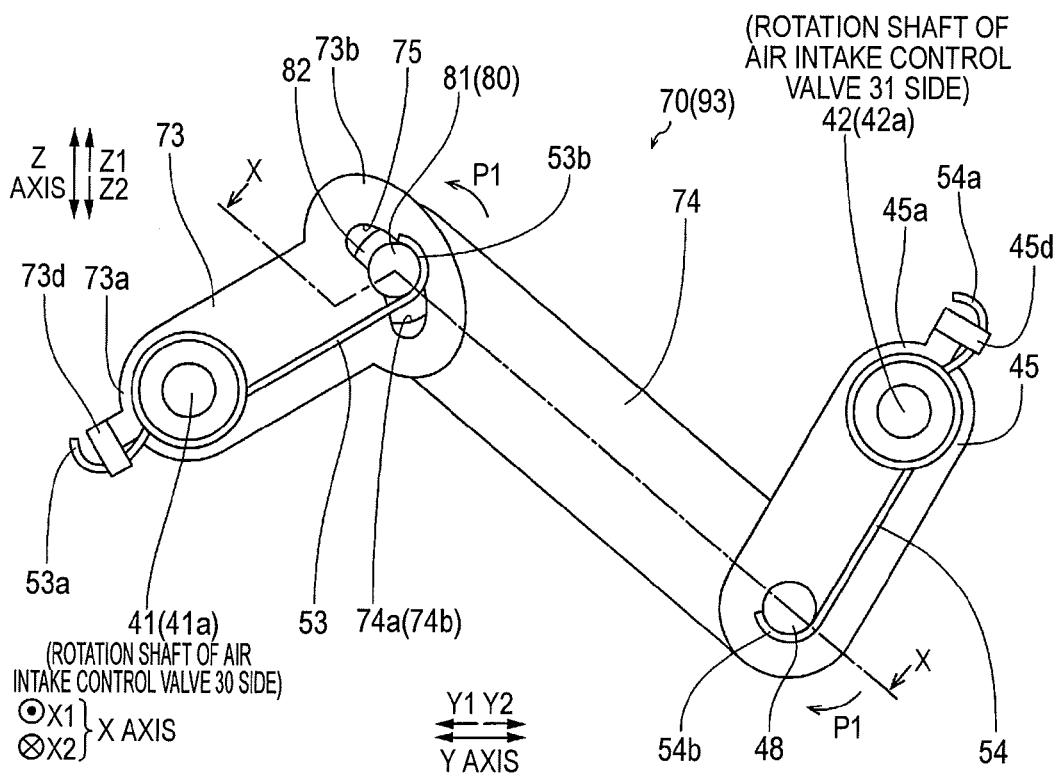
FIG. 9 is a view illustrating a configuration of a link mechanism in an air intake device according to a third embodiment of disclosed here.
Figure 10:
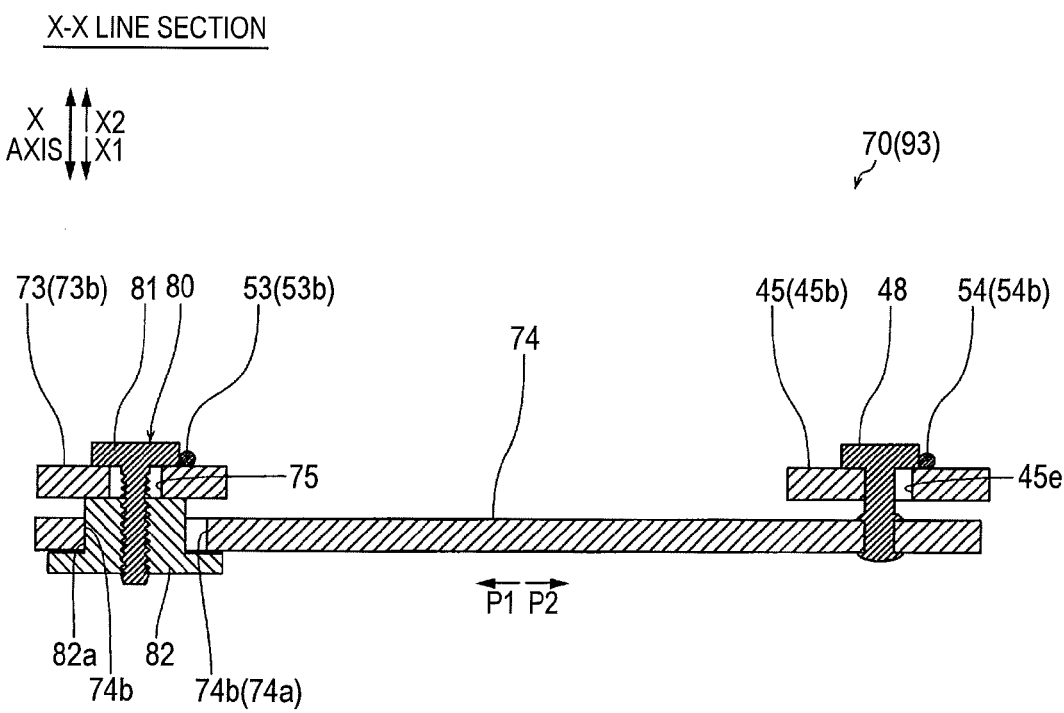
FIG. 10 is a cross-sectional view of the link mechanism taken along line X-X of FIG. 9.

As illustrated in FIG. 9, the air intake device 93 includes a link mechanism 70. The link mechanism 70 includes a drive side rotation shaft 41, a drive side link member 73, a pin member 80, an intermediate link member 74, a pin member 48, a driven side link member 45, and a driven side rotation shaft 42.

Here, in the third embodiment, the other side end portion 73b of the drive side link member 73 is formed with an arc-shaped long hole 75. The pin member 80 is swingably inserted into the long hole 75 in a state where the intermediate link member 74 is rotatably connected to the drive side link member 73. In this case, as illustrated in FIG. 10, the pin member 80 includes a screw member 81 and a nut member 82. In addition, the intermediate link member 74 includes a nut insertion hole 74a into which the nut member 82 can be inserted. By the screw member 81 and the nut member 82, each of the drive side link member 73 and the intermediate link member 74 is rotatably connected to each other in a state where the drive side link member 73 and the intermediate link member 74 are sandwiched between the screw member 81 and the nut member 82. Accordingly, a slight difference between the closed position where the air intake control valve 30 closes the opening portion 11d of each of the air intake ports 11 to 13 and the closed position where the air intake control valve 31 closes the opening portion 11d of each of the air intake ports 14 to 16 is adjusted (absorbed) with respect to the long hole 75 by the tightening position of the pin member 80.

As illustrated in FIG. 9, one side end 53a of the torsion coil spring 53 is engaged to an engagement portion 73d provided in one side end portion 73a of the drive side link member 73 and the other side end 53b is engaged to a screw member 81 (pin member 80). In addition, one side end 54a of the torsion coil spring 54 is engaged to an engagement portion 45d provided in one side end portion 45a of the driven side link member 45 and the other side end 54b is engaged to the pin member 48.

Accordingly, in a state where the intermediate link member 74 is connected to the drive side link member 73 together with the pin member 80 so that a position in the long hole 75 can be adjusted, the pin member 80 is biased by the torsion coil spring 53 in the direction along the rotation direction (arrow P1 direction) of the drive side link member 73. In addition, in this case, it is configured that an outside surface 82a (see FIG. 10) of a nut member 82 abuts on an inside surface 74b (see FIG. 10) of a nut insertion hole 74a and the intermediate link member 74 is biased in the direction along the rotation direction of the drive side link member 73 by the screw member 81 being biased by the torsion coil spring 53 in the direction along the rotation direction (arrow P1 direction) of the drive side link member 73. The other configurations of the air intake device 93 are similar to those of the first embodiment.

Effect of Third Embodiment

In the third embodiment, as described above, in a state where the intermediate link member 74 is connected to the drive side link member 73 together with the pin member 80 so that a position in the long hole 75 can be adjusted, the pin member 80 is configured to be biased by a torsion coil spring 53 in a direction along the rotation direction (arrow P1 direction) of the drive side link member 73. Accordingly, even in a case where an adjustment mechanism for reliably synchronizing and rotating the air intake control valve 30 provided in the drive side rotation shaft 41 and the air intake control valve 31 provided in the driven side rotation shaft 42 is provided in a connection portion between the drive side link member 73 and the intermediate link member 74, rattling between the drive side rotation shaft 41 and the intermediate link member 74 can be easily suppressed.

In addition, in the third embodiment, the intermediate link member 74 is configured to be biased in the direction along the rotation direction of the drive side link member 73 by the screw member 81 being biased by the torsion coil spring 53 in the direction along the rotation direction (arrow P1 direction) of the drive side link member 73 and thus the outside surface 82a of the nut member 82 abutting on the inside surface 74b of the nut insertion hole 74a. Accordingly, since the nut member 82 is biased with respect to the drive side link member 73 in the direction along the rotation direction (arrow P1 direction) of the drive side link member 73 by using the biasing force of the torsion coil spring 53, the generation of rattling between the drive side link member 73 and the intermediate link member 74 can be easily avoided. Other effects thereof are similar to those of the first embodiment.

Modification Example

The embodiment disclosed here can be considered as an example and not restrictive in all respects. The scope disclosed here is indicated not by the description of the embodiment but by the scope of the appended claims, and includes meanings equivalent to the scope of appended claims and all changes (modification examples) within the scope thereof.

For example, although the torsion coil spring 51 (52, 53, 54, 61, 62) is used as the "biasing member" disclosed here in the first to third embodiments, this disclosure is not limited thereto. For example, a leaf spring may be used to suppress the rattling of the link mechanism 40.

In addition, although this disclosure is applied to the link mechanism 40 which rotates the air intake control valves 30 and 31 which change the air intake path length in the air intake device 90 in the first to third embodiments, this disclosure is not limited thereto. For example, this disclosure may be applied to the link mechanism 40 for rotating all at once the air intake flow control valves (tumble control valve or swirl control valve) which control the intake air flow into each cylinder.

In addition, although the biasing force of the torsion coil spring 51 is applied to the pin member 47 and the biasing force of the torsion coil spring 52 is applied to the pin member 48 in the first embodiment, and all the biasing force of the torsion coil springs 61 and 62 is applied to the intermediate link member 64 in the second embodiment, this disclosure is not limited to thereto. In other words, the link mechanism may be configured such that the biasing force of the torsion coil spring 51 is applied to the pin member 47, while the biasing force of the torsion coil spring 62 is applied to the intermediate link member 64.

In addition, although the torsion coil spring 61 is disposed outside the drive side link member 63 and the intermediate link member 64 and the torsion coil spring 62 is disposed outside of the driven side link member 65 and the intermediate link member 64 in a plan view in the second embodiment, this disclosure is not limited thereto. For example, as in the first and third embodiments, the torsion coil spring 61 may be disposed so as to overlap the drive side link member 63 and the intermediate link member 64 and the torsion coil spring 62 may be disposed so as to overlap the driven side link member 65 and the intermediate link member 64.

In addition, although this disclosure is applied to the air intake devices 90 to 93 of the V-type six-cylinder engine 100 for an automobile including a gasoline engine in the first to third embodiments, this disclosure is not limited thereto. In other words, this disclosure may be applied to an internal combustion engine such as a diesel engine and a gas engine. In addition, this disclosure may be applied to an air intake device of a V-type internal combustion engine installed as a power source of facility equipment.

An air intake device according to an aspect of this disclosure includes an air intake valve which is provided so as to change intake air by a rotation shaft being rotated; an actuator which is a driving source for rotating and driving the rotation shaft of the air intake valve; a first link member rotatable by a predetermined operation angle about a rotation shaft; a second link member rotatably connected to the first link member; a connection member which connects the first link member and the second link member so as to be rotatable to each other; and a biasing member whose one side end is engaged to the first link member and whose other side end is engaged to the second link member or the connection member to bias the first link member and the second link member or the connection member so that rattling between the first link member and the second link member is suppressed.

As described above, the air intake device according to one aspect of this disclosure, includes the biasing member whose one side end is engaged to the first link member and whose other side end is engaged to the second link member or the connection member to bias the first link member and the second link member or the connection member so that rattling between the first link member and the second link member is suppressed. Accordingly, since the biasing force of the biasing member for suppressing the rattling can be generated only between the first link member and the second link member which are rotatably connected to each other via the connection member, it can be avoided that the biasing force of the biasing member is directly applied to the actuator via the first link member and the rotation shaft. In other words, the rotation shaft (air intake valve) can be rotated by using the actuator having a smaller capacity without increase in the capacity (driving force) of the actuator. As a result, the rattling between the rotation shaft and the second link member rotatably connected to the rotation shaft can be suppressed, while increase in size of the actuator is suppressed. In addition, since the biasing force of the biasing member is not applied to the rotation shaft via the first link member, for example, even if a resin member is used for the rotation shaft, generation of twisted deformation of the rotation shaft due to biasing force of the biasing member can be suppressed.

In the air intake device according to the aspect, it is preferable that the rotation shaft includes a drive side rotation shaft which is rotated by driving force of the actuator, the first link member includes a drive side link member which is rotated by the drive side rotation shaft, the connection member includes a first connection member which connects the drive side link member and the second link member, and the second link member is rotated via the first connection member according to rotation of the drive side link member, in a state where the second link member or the first connection member is biased by the biasing member with respect to the drive side link member in a direction along a rotation direction of the drive side link member.

With this configuration, biasing force of the biasing member for suppressing the rattling can be generated only between the drive side link member and the second link member, which are rotatably connected to each other via the first connection member. Therefore, direct application of the biasing force of the biasing member to the actuator via the drive side link member and the drive side rotation shaft can be easily avoided. In addition, even if a resin member is used for the drive side rotation shaft, twisted deformation of the drive side rotation shaft due to the biasing force of the biasing member can be easily suppressed.

In the configuration in which the rotation shaft includes a drive side rotation shaft which is rotated by the driving force of the actuator, it is preferable that the rotation shaft further includes a driven side rotation shaft which is rotated according to the rotation of the drive side rotation shaft, the first link member further includes a driven side link member for rotating the driven side rotation shaft according to the rotation of the second link member, the connection member includes a second connection member which connects the driven side link member and the second link member to each other, and the driven side link member and the driven side rotation shaft are rotated via the second connection member according to the rotation of the second link member, in a state where the second link member or the second connection member is biased by the biasing member with respect to the driven side link member in a direction along a rotation direction of the driven side link member.

With this configuration, the biasing force of the biasing member for suppressing the rattling can be generated only between the driven side link member and the second link member, which are rotatably connected to each other via the second connection member. Therefore, application of the biasing force of the biasing member to the driven side rotation shaft via the driven side link member can be easily avoided. As a result, even in a case where a link mechanism which synchronizes and rotates an air intake valve provided in the drive side rotation shaft and an air intake valve provided in the driven side rotation shaft by sequentially interposing the drive side link member, the first connection member, the second link member, the second connection member and the driven side link member is provided in the air intake device, since a small actuator can be used, degree of freedom of layout of each functional component constituting the air intake device can be improved.

In the air, intake device according to the aspect described above, it is preferable that the connection member is a pin member, the biasing member is a torsion coil spring, and in a state where one side end of the torsion coil spring is engaged to the first link member and the other side end of the torsion coil spring is engaged to the pin member, the other side end of the torsion coil spring biases the pin member in a direction along a rotation direction of the first link member.

With this configuration, since the pin member can be biased with respect to the first link member in the direction along the rotation direction of the first link member by using the biasing force of the torsion coil spring, generation of the rattling between the first link member and the second link member which are rotatably connected to each other via the connection member can be reliably avoided.

In the air intake device according to the aspects described above, it is preferable that the biasing member is a torsion coil spring, and in a state where one side end of the torsion coil spring is engaged to the first link member and the other side end of the torsion coil spring is engaged to the second link member, the other side end of the torsion coil spring biases the second link member in the direction along the rotation direction of the first link member.

With this configuration, since the second link member can be biased with respect to the first link member in the direction along the rotation direction of the first link member by using the biasing force of the torsion coil spring, generation of the rattling between the first link member and the second link member which are rotatably connected to each other via the connection member can be reliably avoided.

In the configuration which further includes a driven side rotation shaft by which the rotation shaft is rotated according to the rotation of the drive side rotation shaft, it is preferable that the air intake valve includes a first air intake valve provided so as to change intake air of a cylinder row on one side in the V-type internal combustion engine and a second air intake valve provided so as to change intake air of a cylinder row on the other side in the V-type internal combustion engine, the drive side rotation shaft rotates the first air intake valve by a predetermined operation angle by the driving force of the actuator and the driven side rotation shaft rotates the second air intake valve by a predetermined operation angle via the drive side link member, the first connection member, the second link member, the second connection member, and the driven side link member according to the rotation of the drive side rotation shaft, and the biasing member includes a first biasing member which biases the second link member or the first connection member in a direction along a rotation direction of the drive side link member and a second biasing member which biases the second link member or the second connection member in a direction along a rotation direction of the driven side link member.

With this configuration, by using the small actuator, a link mechanism which synchronizes and rotates the first air intake valve provided in the drive side rotation shaft and the second air intake valve provided in the driven side rotation shaft by sequentially interposing the drive side link member, the first connection member, the second link member, the second connection member, and the driven side rotation shaft can be easily provided in the air intake device of the V-type internal combustion engine.

In the air intake device according to the aspect, the following constitution is also conceivable.

Appendix 1

That is, in the air intake device in which the connection member is a pin member and the biasing member is a torsion coil spring, the first link member includes a first engagement portion to which one side end of the torsion coil spring is engaged.

Appendix 2

In addition, in the air intake device in which the biasing member is a torsion coil spring, the second link member includes a second engagement portion to which the other side end of the torsion coil spring is engaged.

Appendix 3

In addition, in the air intake device further including a driven side rotation shaft by which the rotation shaft is rotated according to rotation of the drive side rotation shaft, the drive side link member includes a long hole into which the first connection member is swingably inserted in a state where the second link member is rotatably connected and the second link member or the first connection member is biased in a direction along a rotation direction of the first link member by the biasing member in a state where the second link member, together with the first connection member, is connected to the drive side link member to be capable of adjusting a position in the long hole.

Appendix 4

In addition, in the air intake device in which the drive side link member includes a long hole, the first connection member includes a screw member and a nut member by which the drive side link member and the second link member are rotatably connected to each other, respectively, in a state where the drive side link member and the second link member are sandwiched between the screw member and the nut member, the second link member includes a nut insertion hole into which the nut member is insertable, and the second link member is biased in a direction along a rotation direction of the drive side link member by an outside surface of the nut member being abutted on an inside surface of the nut insertion hole by the screw member being biased in the direction along the rotation direction of the drive side link member by the biasing member.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An air intake device, comprising:
an air intake valve which is provided so as to change intake air by rotation of a rotation shaft;
an actuator which is a driving source for rotating and driving the rotation shaft of the air intake valve;
a first link member rotatable by a predetermined operation angle about the rotation shaft;
a second link member rotatably connected to the first link member;
a connection member which connects the first link member and the second link member so as to be rotatable to each other; and
a biasing member whose one side end is engaged to the first link member and whose other side end is engaged to the second link member or the connection member to bias the first link member and the second link member or the connection member so that rattling between the first link member and the second link member is suppressed.

2. The air intake device according to claim 1,
wherein the rotation shaft includes a drive side rotation shaft which is rotated by driving force of the actuator,
the first link member includes a drive side link member which is rotated by the drive side rotation shaft,
the connection member includes a first connection member which connects the drive side link member and the second link member, and
the second link member is rotated via the first connection member according to rotation of the drive side link member, in a state where the second link member or the first link member is biased by the biasing member with respect to the drive side link member in a direction along a rotation direction of the drive side link member.

3. The air intake device according to claim 2,
wherein the rotation shaft further includes a driven side rotation shaft which is rotated according to the rotation of the drive side rotation shaft,
the first link member further includes a driven side link member for rotating the driven side rotation shaft according to the rotation of the second link member,
the connection member includes a second connection member which connects the driven side link member and the second link member to each other, and
the driven side link member and the driven side rotation shaft are rotated via the second connection member according to the rotation of the second link member, in a state where the second link member or the second connection member is biased by the biasing member with respect to the driven side link member in a direction along a rotation direction of the driven side link member.

4. The air intake device according to claim 1,
wherein the connection member is a pin member,
the biasing member is a torsion coil spring, and
in a state where one side end of the torsion coil spring is engaged to the first link member and the other side end of the torsion coil spring is engaged to the pin member, the other side end of the torsion coil spring biases the pin member in a direction along a rotation direction of the first link member.

5. The air intake device according to claim 2,
wherein the connection member is a pin member,
the biasing member is a torsion coil spring, and
in a state where one side end of the torsion coil spring is engaged to the first link member and the other side end of the torsion coil spring is engaged to the pin member, the other side end of the torsion coil spring biases the pin member in a direction along a rotation direction of the first link member.

6. The air intake device according to claim 3,
wherein the connection member is a pin member,
the biasing member is a torsion coil spring, and
in a state where one side end of the torsion coil spring is engaged to the first link member and the other side end of the torsion coil spring is engaged to the pin member, the other side end of the torsion coil spring biases the pin member in a direction along a rotation direction of the first link member.

7. The air intake device according to claim 1,
wherein the biasing member is a torsion coil spring, and
in a state where one side end of the torsion coil spring is engaged to the first link member and the other side end of the torsion coil spring is engaged to the second link member, the other side end of the torsion coil spring biases the second link member in the direction along the rotation direction of the first link member.

8. The air intake device according to claim 2,
wherein the biasing member is a torsion coil spring, and
in a state where one side end of the torsion coil spring is engaged to the first link member and the other side end of the torsion coil spring is engaged to the second link member, the other side end of the torsion coil spring biases the second link member in the direction along the rotation direction of the first link member.

9. The air intake device according to claim 3,
wherein the biasing member is a torsion coil spring, and
in a state where one side end of the torsion coil spring is engaged to the first link member and the other side end of the torsion coil spring is engaged to the second link member, the other side end of the torsion coil spring biases the second link member in the direction along the rotation direction of the first link member.

10. The air intake device according to claim 3,
wherein the air intake valve includes a first air intake valve provided so as to change intake air of a cylinder row on one side in the V-type internal combustion engine and a second air intake valve provided so as to change intake air of a cylinder row on the other side in the V-type internal combustion engine,
the drive side rotation shaft rotates the first air intake valve by a predetermined operation angle by the driving force of the actuator and the driven side rotation shaft rotates the second air intake valve by a predetermined operation angle via the drive side link member, the first connection member, the second link member, the second connection member, and the driven side link member according to the rotation of the drive side rotation shaft, and the biasing member includes a first biasing member which biases the second link member or the first connection member in a direction along a rotation direction of the drive side link member and a second biasing member which biases the second link member or the second connection member in a direction along a rotation direction of the driven side link member.

11. The air intake device according to claim 4,
wherein the first link member includes a first engagement portion to which one side end of the torsion coil spring is engaged.

12. The air intake device according to claim 5,
wherein the first link member includes a first engagement portion to which one side end of the torsion coil spring is engaged.

13. The air intake device according to claim 6,
wherein the first link member includes a first engagement portion to which one side end of the torsion coil spring is engaged.

14. The air intake device according to claim 7,
wherein the second link member includes a second engagement portion to which the other side end of the torsion coil spring is engaged.

15. The air intake device according to claim 8,
wherein the second link member includes a second engagement portion to which the other side end of the torsion coil spring is engaged.

16. The air intake device according to claim 9,
wherein the second link member includes a second engagement portion to which the other side end of the torsion coil spring is engaged.

17. The air intake device according to claim 3,
wherein the drive side link member includes a long hole into which the first connection member is swingably inserted in a state where the second link member is rotatably connected, and
the second link member or the first connection member is biased in a direction along a rotation direction of the first link member by the biasing member in a state where the second link member, together with the first connection member, is connected to the drive side link member to be capable of adjusting a position in the long hole.

18. The air intake device according to claim 17,
wherein the first connection member includes a screw member and a nut member by which the drive side link member and the second link member rotatably connect to each other, respectively, in a state where the drive side link member and the second link member are sandwiched between the screw member and the nut member,
the second link member includes a nut insertion hole into which the nut member is insertable, and
the second link member is biased in a direction along a rotation direction of the drive side link member by an outside surface of the nut member being abutted on an inside surface of the nut insertion hole by the screw member being biased in the direction along the rotation direction of the drive side link member by the biasing member.

* * * * *